United States Patent [19]

Frantz

[11] 4,267,757
[45] May 19, 1981

[54] CABLE SLITTER

[75] Inventor: Robert H. Frantz, Newville, Pa.

[73] Assignee: AMP Incorporated, Harrisburg, Pa.

[21] Appl. No.: 71,229

[22] Filed: Aug. 30, 1979

[51] Int. Cl.³ .................... B26D 7/02; B26D 1/14; B26D 5/10

[52] U.S. Cl. .................... 83/464; 83/471.2; 83/481; 83/485; 83/555; 83/564; 83/925 R; 83/508

[58] Field of Search .............. 83/455, 456, 471.2, 83/481, 483, 485, 508, 555, 563, 564, 614, 925 R, 464

[56] References Cited

U.S. PATENT DOCUMENTS

| | | |
|---|---|---|
| 532,554 | 1/1885 | Hershey . |
| 651,789 | 6/1900 | Woolf . |
| 840,928 | 1/1907 | Gamston ........................ 83/614 |
| 1,054,143 | 2/1913 | Plost . |
| 1,511,016 | 10/1924 | Barker ........................ 83/483 |
| 1,670,688 | 5/1928 | Monaco ........................ 83/485 |
| 1,730,196 | 10/1929 | De Pamphilis ................ 83/481 |
| 1,734,643 | 11/1929 | Olsen . |
| 2,823,969 | 2/1958 | Traver et al. ................ 83/614 |
| 3,213,736 | 10/1965 | Keeton ........................ 83/455 |
| 3,473,218 | 10/1969 | Travis . |
| 3,481,802 | 12/1969 | Marcell . |
| 3,682,027 | 8/1972 | Insolio et al. ................ 83/481 |
| 3,712,166 | 1/1923 | Rossetti ....................... 83/455 |
| 3,779,119 | 12/1973 | Broides ........................ 83/455 |

Primary Examiner—J. M. Meister
Assistant Examiner—K. Bradford Adolphson
Attorney, Agent, or Firm—Russell J. Egan

[57] ABSTRACT

A tool is disclosed for slitting cable to separate individual conductors or groups of conductors from the cable as a whole and as required in order to form a wiring harness. The subject tool is particularly useful for slitting cable of the type known as flat flexible cable in which a plurality of flat conductors are embedded in or laminated between sheets of insulation. The tool includes a cutting head in which one or more cutting elements is inserted. Each cutting element has at least one cutting wheel fixed thereon at a particular location which would lie between conductors of the cable. The tool also includes clamping means so that the cable is securely positioned and will not slip during the cutting operation.

6 Claims, 6 Drawing Figures

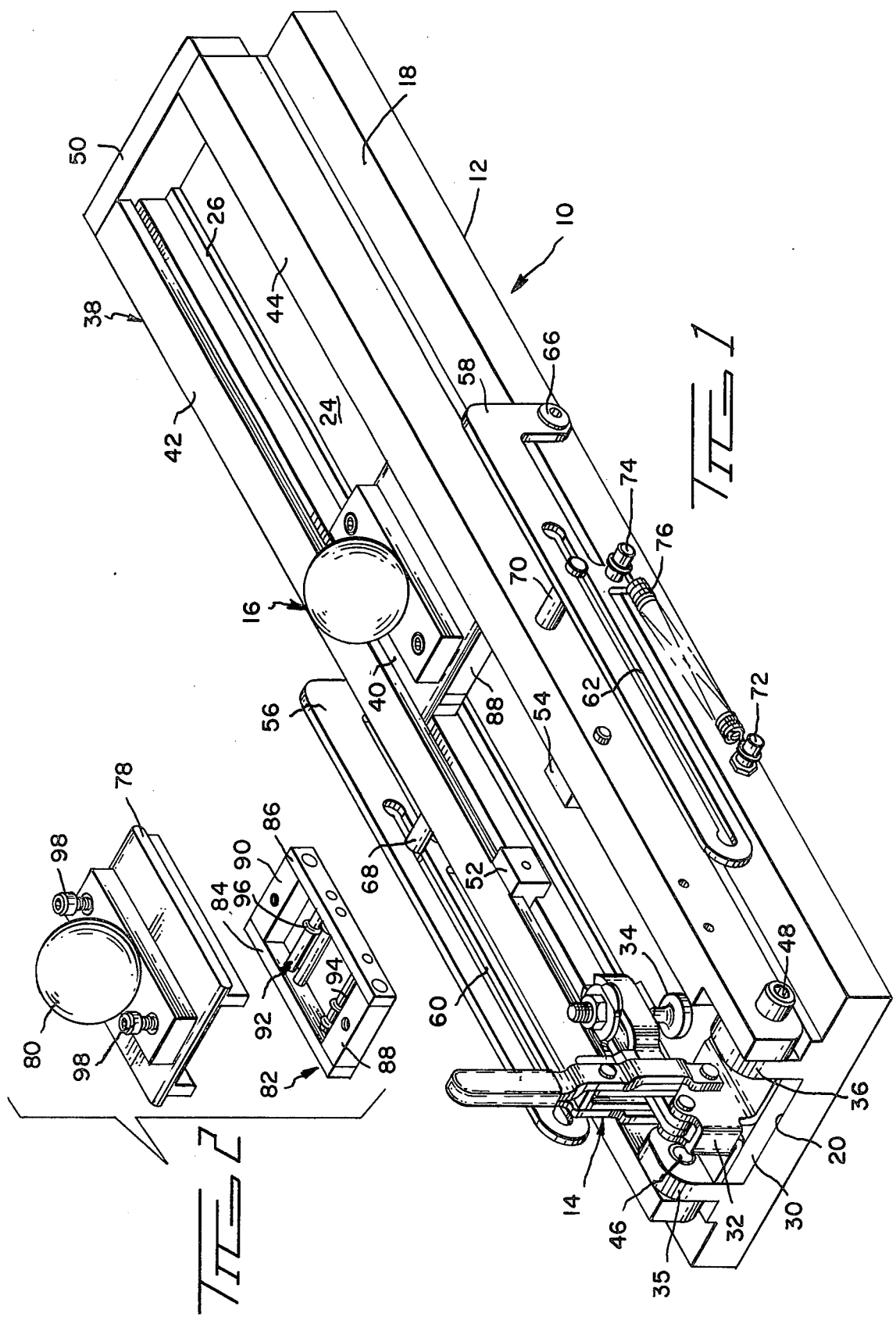

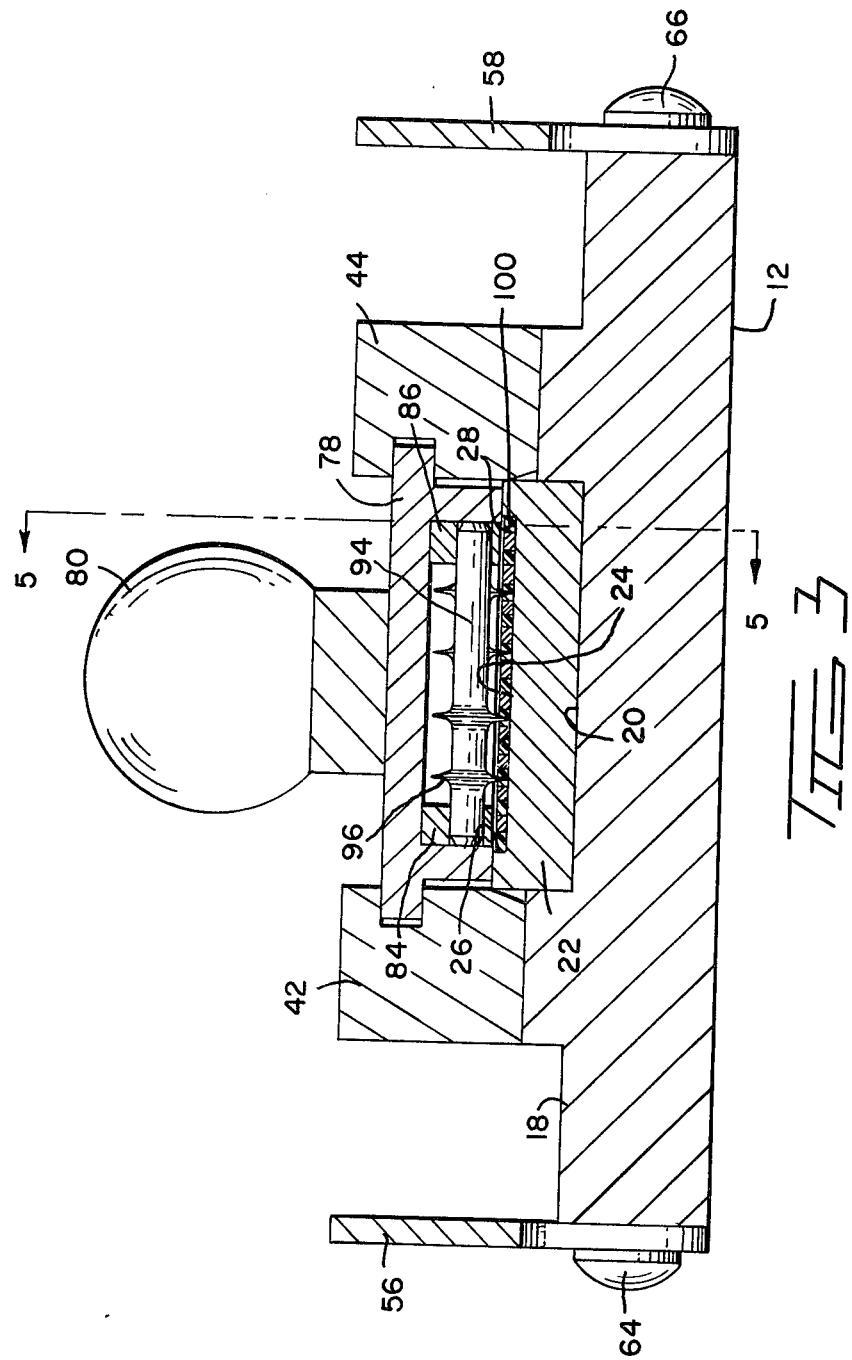

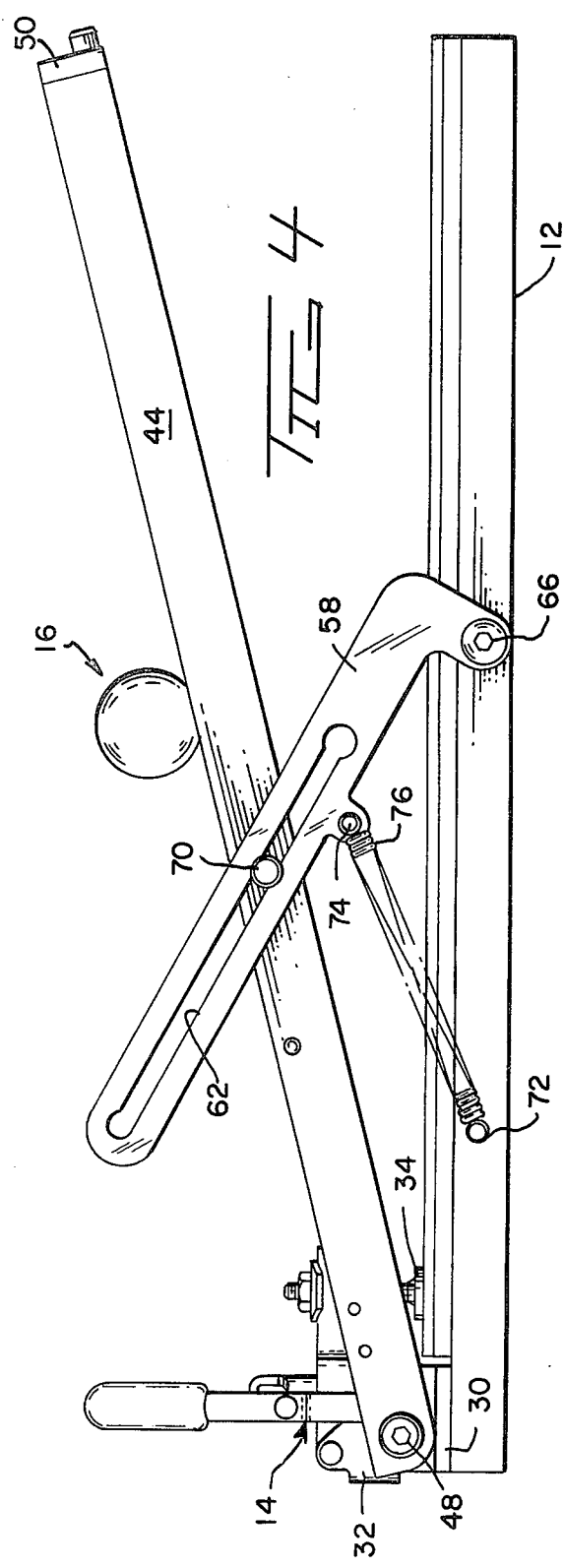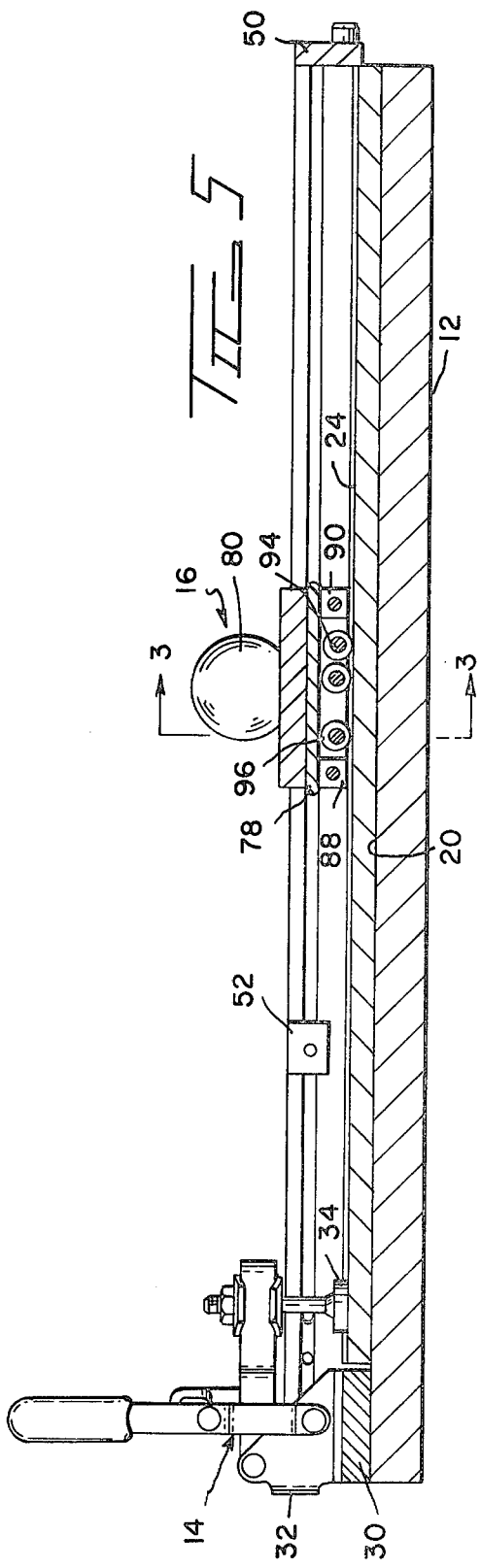

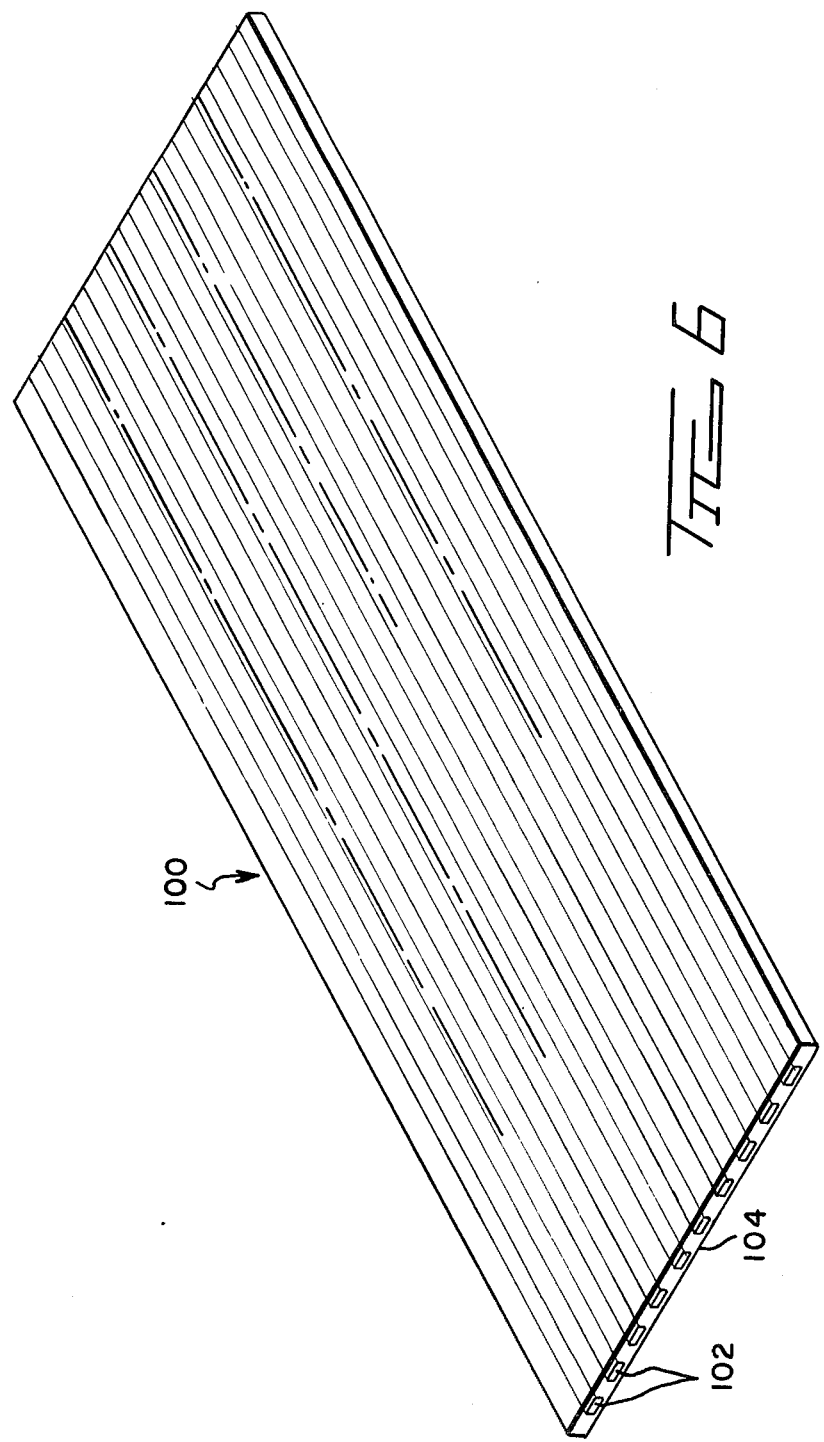

CABLE SLITTER

BACKGROUND OF THE INVENTION

1. The Field of the Invention

The present invention relates to a cable slitter and in particular to a tool for slitting multi-conductor flat flexible cable having flat conductors embedded in insulation.

2. The Prior Art

Cable harnesses are prepared in one of two ways. Either discrete wire is terminated and assembled in a bundle to form a cable harness or a pre-formed cable, in which a plurality of conductors are secured in a parallel spaced relationship within insulation, is cut to the appropriate length and the ends thereof terminated. A cable harness made of discrete wire presents no problem in separating the various conductors to effect their respective connection in its ultimate use. The cable harness made with pre-formed cable forms somewhat of a problem when it is being connected since the conductors are all secured with relative fixed spacing. It, therefore, is necessary to split the cable to separate the conductors sufficiently to allow them to effect their proper connection. Slitting is generally not too much of a problem with a ribbon type cable since the individual conductors there are surrounded by insulation with an indentation or recess being formed between adjacent conductors. However, in the case of flat flexible cable employing flat conductors it is a problem since the insulation is usually formed over the conductors, either as an extruded layer or as a pair of laminated sheets securing the conductors therebetween. This type of cable does not tear readily and any such tearing likely would expose a conductor thereby deteriorating the value of the cable as a whole.

Tools for cutting webs of material, such as multiconductor cable, are known. These generally have some member which supports the web as it is moved longitudinally beneath cutting members mounted at a fixed location. U.S. Pat. No. 532,554 shows a candy cutting machine which has a plurality of parallel, spaced cutting blades and a plain roller making tangential contact with the blades. The roller and blades are rotatably driven to draw the candy therebetween while cutting it into strips. U.S. Pat. No. 651,789 shows another candy cutting machine in which an endless belt carries the candy web beneath cutting blades. U.S. Pat. No. 1,054,143 shows a metal cutting machine in which the member to be cut is placed on a traveling table and carried beneath the planer head. U.S. Pat. No. 1,734,643 shows a paper cutter in which the paper is slit as it is pulled over a guard plate and beneath a series of fixed blades. In each of these known devices there is some mechanism to both support and move the material to be cut. This can lead to inaccuracies in cutting should the web buckle or shift in any manner.

SUMMARY OF THE INVENTION

The present invention relates to a cable slitting tool which can be used to separate the conductors of a pre-formed cable as desired. The subject tool includes a base plate having an elongated cable guide and cutting surface. A cable clamp is fixed to the plate at one end of the cutting surface. A cutter assembly is hingedly attached to one end of the base and a cutter slide block is movably mounted within the guide. The cutter slide block includes at least one cutting unit each having at least one cutter blade fixed on a shaft at a position to cut between adjacent conductors. The cutting units are mounted in the slide block in a predetermined configuration to achieve the desired separation of conductors of the cable.

It is therefore an object of the present invention to produce a cable slitting tool which can be used to separate the conductors of flat flexible cable in substantially any desired pattern.

It is a further object of the present invention to produce a cable slitting tool which can be readily adapted to cut any pattern of conductors from a pre-formed flat flexible cable to separate them individually or in groups.

It is a further object of the present invention to produce a cable slitting tool which can be readily and economically manufactured.

The means for accomplishing the foregoing objects and other advantages will be apparent to those skilled in the art from the following detailed description taken with reference to the accompanying drawings.

BRIEF DESCRIPTION OF THE DRAWINGS

FIG. 1 is a perspective view of the subject cable slitter tool;

FIG. 2 is an exploded perspective view of the cutter slide block;

FIG. 3 is a transverse section taken along line 3—3 of FIG. 5;

FIG. 4 is a side elevation of the subject tool in an opened condition;

FIG. 5 is a longitudinal section taken along line 5—5 of FIG. 3; and

FIG. 6 is a perspective view of a flat flexible cable of the type which would be slit by the subject tool.

DETAILED DESCRIPTION OF THE PREFERRED EMBODIMENT

The subject tool 10 comprises a base 12, a cable clamp assembly 14, and a cutter assembly 16. The base is a generally elongated member having an upper surface 18 with a channel 20 formed centrally thereof and extending in an elongated direction. A channel-shaped insert 22 is placed in the channel 20 and has an upwardly directed cutting surface defined by a hardened surface 24 and a pair of spaced sidewalls 26, 28.

The clamp assembly 14 is mounted on a base 30 at one end of the base and at the end of the insert 22. The clamp base 30 serves as a cable stop as well as support for the lever mechanism 32 used to actuate the clamping pad 34 with respect to the cutting surface 24. The clamp base is also positioned between two spaced upstanding pivot support members 35, 36 which are integral extensions of the base 12 on either side of base 30 and insert 22.

The cutter assembly includes a cutting block frame 38 and a cutter slide block 40. The frame 38 is formed by a pair of parallel spaced side rails 42, 44 each of which has one end pivotably attached to pivot members 35, 36, respectively by pins 46, 48, respectively, and the free ends secured to the rail cap 50. A pair of adjustable stop blocks 52, 54 are adjustably secured to the respective side rails 42, 44. The frame 38 is also attached to the base by means of hinge assemblies each of which includes a hinge member 56, 58 having an L-shaped configuration with an elongated detented slot 60, 62 in the long arm thereof. The free end of the shorter arm of each hinge member is attached to the base by a pivot pin 64, 66. A guide pin 68, 70 is fixed to each respective side rail and extends through the slot 60, 62 of the adjacent hinge member. The hinges are completed by a pair of spring pins 72, 74 which are fixed respectively to the base member and to the hinge member and are joined together by a helical spring 76. The cutter slide block 40 includes a cutter slide member 78 having a handle 80 fixed to the upper surface thereof. The cutter slide member has a downwardly directed channel profile which receives an insert 82 therein. The insert is formed by a pair of parallel spaced cutter bearing members 84, 86 joined at the ends by retainers 88, 90. At least one cutter member 92 is received in the insert between the cutter bearing members and is an integral member having a shaft portion 94 with at least one radially directed blade portion 96 fixed thereon. The cutters can have any number of blades fixed thereon at any desired location so that it will be possible to utilize a combination of cutter members 92 to achieve the desired cutting pattern. The insert 82 is held in the slide 78 by screws 98 so that the insert 82 can be simply removed and the cutter members changed without requiring any major disassembly of the subject tool.

Before operating the subject slitting tool, an insert 22 of the desired width is mounted in the base 12. The insert 82 is prepared by placing therein cutter members 92 having blades 96 at the desired location for slitting the cable. The insert 82 is then fixed in the slide block 78.

In operation the cutter assembly 16 is opened to an approximately 45° angle and held open by the detent portions of the hinge member slots. A cable 100 such as the one shown in FIG. 6, is inserted therein by laying it in the channel 20 of the insert member 22. The side walls 26, 28 will center and align the cable. The clamp 14 is then applied to the free end of the cable 100 and the cutter assembly 16 is closed while holding the slide block against the stops. During this closure movement, the cutter slide block 40 comes down with sufficient force to penetrate the cable 100 to start the initial cutting action. The slide block 40 is then moved longitudinally of the tool and cable to cause the desired cutting to take place. The cutter assembly is then raised and the clamp released to free the cable.

The cable 100 shown in FIG. 6 is of the type manufactured by the processes described in either U.S. Pat. Nos. 3,473,218 or 3,481,802, the disclosures of which are incorporated herein by reference. In either case the cable is formed with a plurality of flat conductors 102 secured in fixed parallel spaced relation by insulation 104 which can either be extruded over the conductors or laminated thereon.

The present invention may be subject to many modifications and changes without departing from the spirit or essential characteristics thereof. The present embodiment should therefore be considered as illustrative and not restrictive of the scope of the invention.

I claim:

1. A slitting tool for separating conductors of multi-conductor flat flexible insulated cable into individual conductors or groups of conductors at one end of the cable, said tool comprising:
    a base member defining an elongated, flat cable receiving surface;
    a cable stop at one end of said surface;
    cable clamping means adjacent said stop and adapted to secure a cable against said surface;
    a cable cutter assembly pivotally attached by one end to an end of said base member so as to be movable with respect to said surface independent of said cable clamp to provide access to said surface in an open condition and aid in securing the cable against said surface in a closed position, said cutting assembly having a frame formed by a pair of parallel spaced side rails each with a like end pivotally attached to said base member, hinge means attached intermediate the ends of the frame and said base and adapted to open the frame to an angle of approximately 45° with respect to said base, a slide block movable along said side rails longitudinally of said cable receiving surface, and cutter means carried by said slide block, said cutter means comprising a module exchangeably secured to said slide block and slitting blades carried in said module in longitudinally and transversely spaced relationship.

2. A slitting tool according to claim 1 wherein said base member further comprises:
    a channel-shaped insert forming said flat cable receiving surface, the side walls of said channel forming a cable guide.

3. A slitting tool according to claim 1 wherein said hinge means are spring loaded so that upon closure of said frame sufficient force is imparted to cause said cutter means to initially penetrate said cable.

4. A slitting tool according to claim 1 wherein said slide block
    has a channel profile directed downwardly toward said cable receiving surface and a handle secured to the opposite upper surface; and
    said module being received in said channel profile, said module having a pair of parallel spaced bearing members; and said slitting blades mounted between said bearing members.

5. A slitting tool according to claim 4 wherein each said at least one cutter blade comprises:
    a shaft; and
    at least one cutting disc secured thereto.

6. A slitting tool according to claim 1 further comprising:
    stop members adjustably secured to said side rails to limit the movement of said slide block therealong.

* * * * *